United States Patent [19]
Yamanaka et al.

[11] 3,801,040
[45] Apr. 2, 1974

[54] STRIPPING AND FEEDING DEVICE FOR STRIP MATERIAL

[75] Inventors: Torakiyo Yamanaka, Yokohama; Yoshihiro Shigeta; Kuniyoshi Suzaki, both of Tokyo, all of Japan

[73] Assignee: Canon Kabushiki Kaisha, Tokyo, Japan

[22] Filed: Oct. 6, 1971

[21] Appl. No.: 186,854

[30] Foreign Application Priority Data
Oct. 7, 1970 Japan.............................. 45-88001
Oct. 7, 1970 Japan.............................. 45-88002

[52] U.S. Cl..................... 242/192, 226/91, 352/157
[51] Int. Cl......................... G03b 1/04, G11b 15/32
[58] Field of Search .......... 242/186, 192, 194, 195; 274/4 C, 11 C; 226/91, 92; 352/157, 158

[56] References Cited
UNITED STATES PATENTS
3,536,276  10/1970  Bundschuh et al. ............... 242/192
3,429,518  2/1969  McKee............................... 242/186
3,666,205  5/1972  Cherniavskyj ..................... 242/192

Primary Examiner—Leonard D. Christian
Attorney, Agent, or Firm—Fitzpatrick, Cella, Harper & Scinto

[57] ABSTRACT

The invention provides a stripping and feeding device for strip material which includes a mechanism for rotating a roll of film or like strip material and positively strip the leader end portion therefrom and guide the same to a stripping station for feeding, and a film passage for controlling the direction in which the stripped leader end portion is effectively threaded from the roll, whereby the film feeding may be effectively achieved.

14 Claims, 9 Drawing Figures

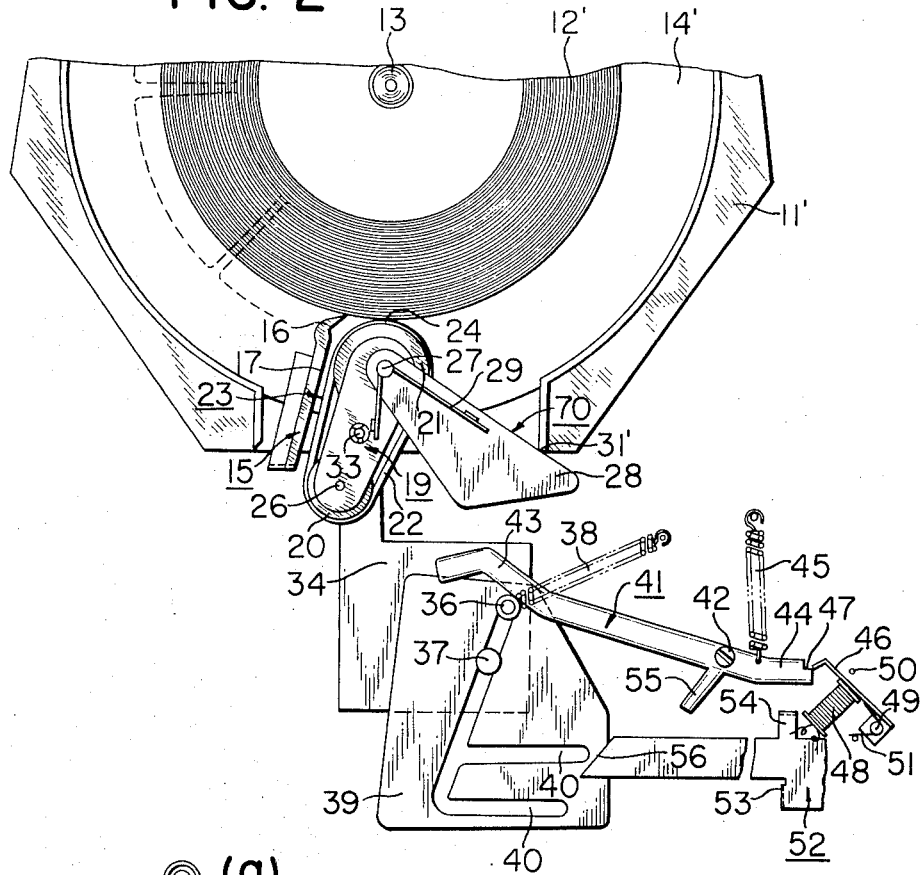
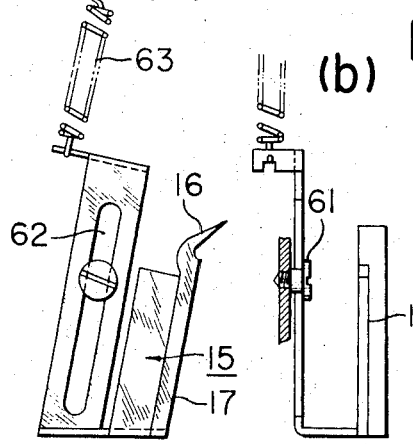

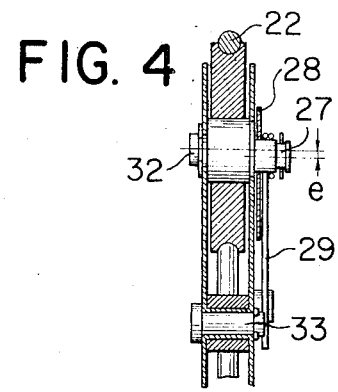
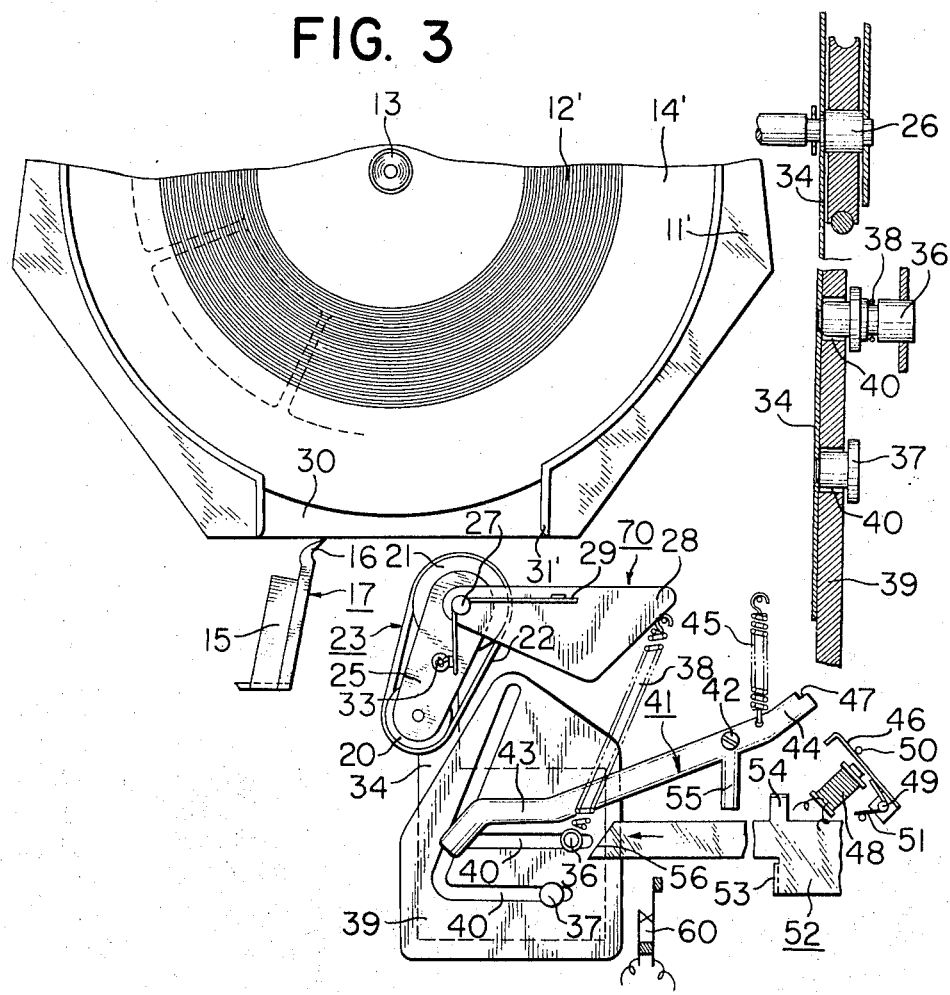

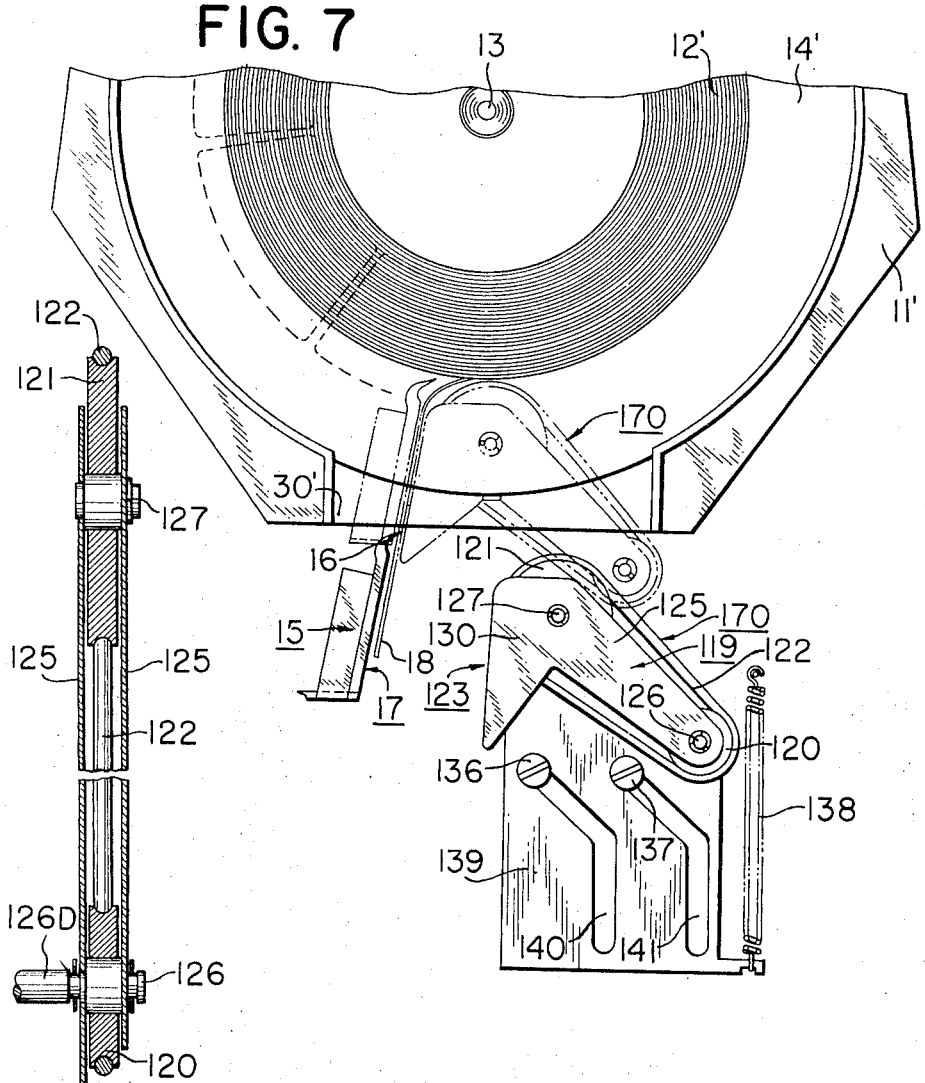
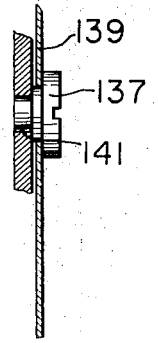

STRIPPING AND FEEDING DEVICE FOR STRIP MATERIAL

BACKGROUND OF THE INVENTION

1. Field of the Invention

This invention relates to the construction of a device for stripping a leader end portion off a roll of strip material such as film or tape and feeding the strip material in motion picture projectors, microfilm readers, tape recorders or the like.

2. Description of the Prior Art

Various types of mechanism and device for feeding a strip material such as film or the like have heretofore been proposed, but most of them have been arranged such that a film feeding member and a passage defining member are provided by an endless belt wrapped around three rollers. This arrangement has imposed limitations upon the construction of the driving mechanism for feeding the film or like strip material, because during the feeding of such strip material a positional relation best suited for the feeding must be established among the belt directly engaged with the roll of film or like strip material, the leader end portion of such strip material and the film stripper. More specifically, if the leader end portion of the strip material does not lie at the feeding station which is defined by the position where the belt is pressure-engaged with the roll of strip material and by the position where the stripper bears against such roll, then the roll must be rotated with the belt in pressure contact with the roll until the leader end portion of the strip roll is brought to the said feeding station. Actually, however, the feeding operation has suffered from an inconvenience that before brought to the feeding station by the belt, the leader end portion of the strip material is immaturely unwound from the roll to go out through an opening in the cartridge containing such roll therein or to be folded in the vicinity of the cartridge opening. Such an inconvenience could be avoided as by using threading means consisting of three rollers. Nevertheless, the use of such three rollers would increase the dimensions of the threading means, as compared with the case where the threading means uses two rollers.

The conventional threading means comprising two rollers and an endless belt wrapped around these two rollers is disclosed in U.S. Pat. No. 3,429,518, whereas this patent shows no element for preventing the aforesaid undesirable tendency of the strip leader end portion to immaturely come off the roll of strip material before reaching a predetermined feeding station.

SUMMARY OF THE INVENTION

It is an object of the present invention to eliminate the above-described disadvantages and provide a stripping and feeding device for strip material which includes threading means consisting of two rollers and an endless belt wrapped around the two rollers.

It is another object of the present invention to provide a stripping and feeding device for strip material which includes a threading portion for strip material consisting of an endless belt wrapped around two rollers and a guide member for strip material resiliently mounted on the threading means to shift the leader end portion of the strip material to the threading portion.

It is still another object of the present invention to provide a stripping and feeding device which includes a threading member consisting of an endless belt wrapped around two rollers, the threading member being disposed so as to feed the leader end portion of the strip material in a threading direction, and a passage defining member formed integrally with the threading member for threading the leader end portion stripped by a stripper.

Other objects and features of the present invention will become fully apparent from the following description of some specific embodiments thereof taken in conjunction with the accompanying drawings.

BRIEF DESCRIPTION OF THE DRAWINGS

FIGS. 2 and 3 are front views of the same device when it uses a larger cartridge, FIG. 2 showing the threading means and stripping means in their operative positions and FIG. 3 showing these means in their inoperative or retracted positions.

FIG. 4 is an enlarged sectional view taken along lines IV—IV in FIG. 1.

FIGS. 5(a) and 5(b) are a front view and a side view showing details of the stripping means incorporated in the device of the present invention.

FIG. 7 is a front view of the FIG. 6 device when it uses a larger cartridge, and showing the threading means and stripping means in their inoperative or retracted position.

FIG. 8 is an enlarged sectional view taken along lines VIII—VIII in FIG. 6.

DESCRIPTION OF THE PREFERRED EMBODIMENTS

Figure 9:
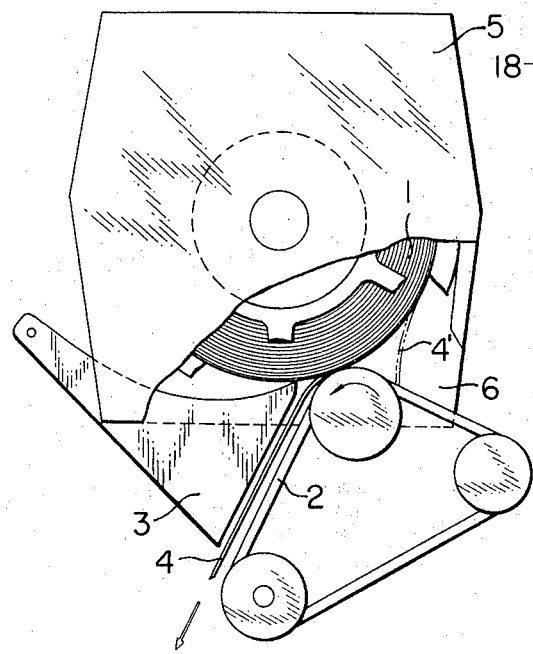
FIG. 9 shows, in front view, the essential parts of the conventional threading and stripping means in their operative positions.

To make the present invention distinctly understood, the conventional device for feeding a film or like strip material from a roll thereof with the aid of rollers will further be described with reference to FIG. 9. In order to feed a rolled strip material 1 such as film or the like in the direction as indicated by an arrow, the leader end portion 4 of the strip material should most desirably be located between an endless belt 2 to be urged into direct contact with the roll of strip material 1 and a stripper 3 for stripping the strip material off such roll. However, such leader end portion 4 is normally located at a random position on the roll and therefore, the roll must be rotated until the leader end portion 4 is brought to a predetermined feeding position described above. During such rotation of the roll, the leader end portion 4 thereof often tends to come off the roll as indicated at 4' before it reaches the belt 2, and if the number of the rollers supporting the belt 2 were less than three and the belt were not in a position corresponding to such deviated leader end portion 4', the leader end portion 4' would be freely unwound from the roll 1 to leave a cartridge 5 through an opening 6 therein toward the exterior of the cartridge, thus resulting in a failure to achieve the initial feeding of the strip material. Such inconvenience could be avoided by the provision of threading means comprising three rollers, but such threading means will offer a special problem which in turn would lead to limitations in the arrangement of the rollers. All these disadvantages can be overcome by the present invention.

Figure 1:
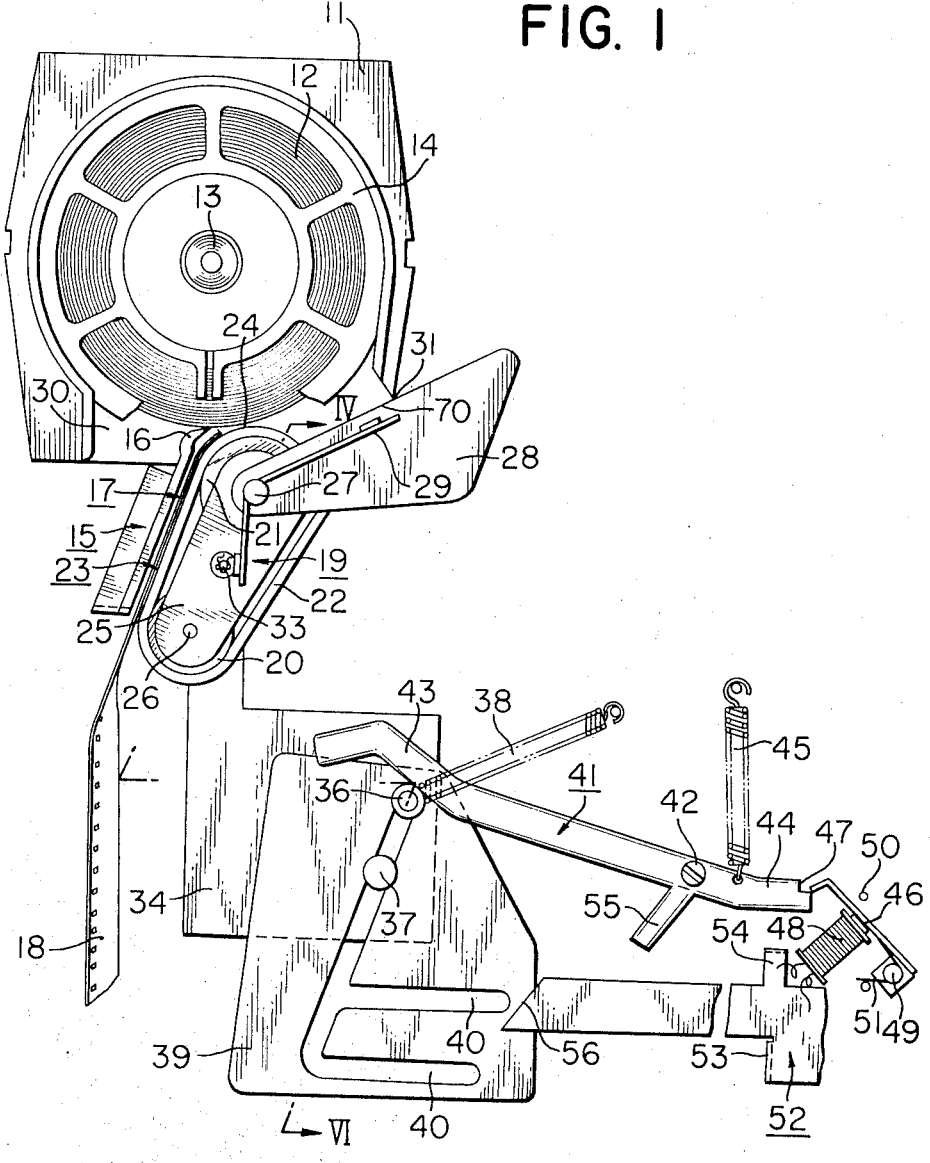
FIG. 1 is a front view of the device according to an embodiment of the present invention when it uses a smaller cartridge.

Referring now to FIG. 1, there is shown an embodiment of the present invention together with a smaller cartridge containing therein a roll of film or similar strip material having a leader end portion. Such a smaller cartridge is designated by numeral 11 and the roll of film therein is designated by numeral 12. The roll of film 12 in the cartridge 11 is rotatably mounted about a spindle shaft 13 and supported on a reel 14.

Stripping means, threading means and driving means according to an embodiment of the present invention will now be described with reference to FIGS. 1 to 5. A stripper 15, as will be described for further details, chiefly comprises a pawl-like end portion 16 adapted to bear against the outermost periphery of the film roll to strip the leader end portion 18 off the roll, and a passage surface 17 for guiding the stripped leader end portion to a conventional take-off claw (not shown), which is, for example, shown in U.S. Pat. No. 3,029,686. Film threading means is designated by numeral 19 and chiefly comprises two rollers 20 and 21, an endless belt 22 formed as of rubber and wrapped around the two rollers 20, 21, a threading surface 23 disposed in opposed and cooperable relationship with the passage surface 17 of the stripper means to guide and thread the film leader end portion 18, a threading portion 24 in which the belt 22 is urged into contact with the film roll to thereby rotate the latter, and a base plate 25 for rotatably supporting the two rollers 20 and 21. One of these two rollers which is designated at 20 is a driving roller rotatable with a driving shaft 26 which is rotatably journalled to the body of the device. The other roller 21 provides a driven roller. The film threading means has a guide member 28 fitted thereto, which, as shown more particularly in FIG. 4, is pivotally mounted on an eccentric shaft 27 which is eccentric by a distance "e" from and secured to a driven roller shaft 32 and which has a surface 70 adapted to engage and guide the film leader end portion to the threading portion 24. Thus, the guide member 28 constitutes guide means for the film leader end portion. The guide member 28 is normally biased for counterclockwise rotation by a spring 29 so as to bear against the opening end 31 of the cartridge when the cartridge is inserted in the device.

As the driven roller shaft 32 rotates with the driven roller 21, the eccentric shaft 27 is rotated eccentrically with respect to the shaft 32 to thereby vibrate the guide member 28. Such vibrations of the guide member 28 bring the leader end portion 18 of the film to a position where it is ready to be guided to the threading portion 24 by the belt 22. Needless to say, the belt 22 also acts as guide means.

The cartridge 11 is formed with an opening 30 through which the leader end portion 18 of the film roll 12 may be passed outwardly of the cartridge when the aforesaid stripping means 15 and the threading means 19 with the guide member 28 move into the cartridge.

In the drawings, the cartridge 11 is shown with its top cover and upper reel flange cut away or omitted so as to clearly indicate the station where the roll film is engaged by the stripping means and by the threading means. Also, in FIGS. 2 and 3, a larger cartridge and its reel and opening are all designated by dashed numbers corresponding to the numerals used for the smaller cartridge and its parts shown in FIG. 1.

Driving means for the stripping and the threading means will now be discussed. In FIGS. 1 to 4, the film threading means 19 is mounted on a movable plate 34 by a fitting member 33 which fixes the threading means substantially at the center thereof. The movable plate 34 is movable with respect to the body of the device in the manner to be described. The movable plate 34 has studded pins 36 and 37, one of which 36 has secured thereto one end of a coil spring 38 whose other end is secured to the device body. The two pins 36 and 37 are slidably received in guide grooves 40 formed in a plate 39 fixed to the device body or in a part of the body casing (FIG. 4).

A rockable lever 41 is provided as means for releasing the threading means 19 from its resilient contact with the film roll 12. The lever 41 is rockable about a shaft 42 studded in the device body and has one end 43 engageable with the pin 36. The other end of the rockable lever 41 has secured thereto one end of a coil spring 45, whose other end is secured to the device body. A retaining member 46 is provided to engage the lever 41 at a cut-away portion 47 formed at one end thereof and to restrain the lever 41 from being rotated by the force of the spring 45. The retaining member 46 may be attracted by a plunger magnet 48 so as to rotate counter-clockwise about a fixed shaft 49 spring-supported on the device body, until it engages the cut-away portion 47 of the rockable lever 41 to hold this lever in the position as shown in FIG. 1 or 2 and accordingly hold the threading means 19 in its operative position. When the rockable lever 41 is released from its restrained position by the plunger magnet 48 which is deenergized upon detection of the arrival of the film leader end portion at the take-off claw (not shown), the lever 41 may be rotated counter-clockwise about the pivot 42 by the force of the coil spring 45 until one end 43 of the lever 41 engages and depresses the pin 36 and accordingly lowers the movable plate 34, thereby releasing the film threading means 19 from its engagement with the film roll. A stop member 50 is provided to limit the pivotal movement of the retaining member 46 and a return spring 51 is provided to return this retaining member to its initial position.

A start member 52 for the threading means 19 has an integrally formed member 53 adapted to close a switch 60 to thereby start a film feeding operation. The aforesaid rockable lever 41 is provided with an arm 55 adapted to engage the projection 54 of the start member 52 to retain the lever 41 against movement. The start member 52 may be moved in the leftward direction as indicated by arrow in FIG. 3, which is the direction for the tip end 56 thereof to disengage the pins 36 and 37 from their associated grooves 40, thus bringing the film threading means 19 from its retracted or inoperative position of FIG. 3 to its advanced or operative position.

FIG. 5 specifically shows the construction of the stripping means 15. A pin 61 is provided to guide the movement of the stripper into pressure contact with the film roll. This pin is received in a guide slot 62 so as to be slidable therein in a direction for moving the stripper 15 toward the film roll. A coil spring 63 is provided to bias the stripper 15 into engagement with the roll of film.

The operation of the illustrated embodiment of the present invention will be described hereunder. Although not shown, driving means for the stripper means 15 may be any known suitable means such as plunger magnet or the like. After the device is loaded with a cartridge, such driving means is driven to move the stripper means 15 into the cartridge through its opening 30 or 30' and the stripper means is brought into resilient contact with the roll of film by the force of the coil spring 63. As the stripper means 15 thus moves into the cartridge, the start member 52 for the film threading means 19 is moved leftwardly as shown in FIG. 3, thereby forcing the pins 36 and 37 into sliding movement to bring about the operative position as shown in FIGS. 1 or 2. At the same time, the switch 60 is closed to drive the driving roller 20 and accordingly the belt 22 to rotate the roll of film in the clockwise direction. By such clockwise rotation, the film roll, which may then be in any other position than that between the threading portion 24 and the stripper end 16, is caused to come around the roll and to the threading portion 24. In the course of such movement, the film leader end may tend to take the position as indicated at 4' in FIG. 9, but this is avoided because the leader end travels along the guide surface 70 of the guide member 28 normally vibrated by the eccentric shaft 27 and is effectively brought into the threading portion 24 and then to the stripper end 16 by the moving belt 24. Even if the cartridge in use is of greater size, the leader end portion is guided by the guide member 28, which is then positioned as shown in FIG. 2, and further moved to the threading portion 24 and stripped off the roll by the stripper end 16, whereafter the stripped leader end portion is threaded through the passage between the stripper and the threading means in the same manner as shown in FIG. 1.

Figure 6:
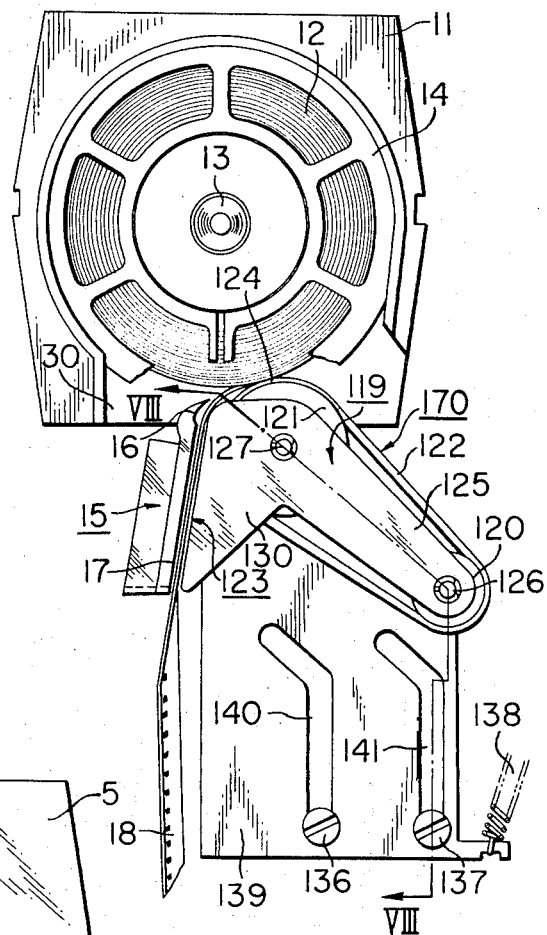
FIG. 6 is a front view of the device according to another embodiment of the present invention when it uses a smaller cartridge.

Another embodiment of the present invention is shown in FIGS. 6 to 8, wherein the cartridges are similar to those used with the previous embodiment and therefore are designated by like numerals.

FIG. 6 shows the case where a smaller cartridge is used, and FIG. 7 shows the case where a larger cartridge is used. In these figures, the stripper means is similar to that used in the previous embodiment and designated by similar numerals. In this alternative embodiment, the film threading means is modified from the previously described one. More specifically, the film threading means 119 in this alternative embodiment comprises a driven roller 121 driven by a driving roller 120 and adapted to engage a belt 122 thereon with a roll of film 12 or 12' and thereby rotate the roll, and a base plate 125 supporting these two rollers thereon. The arrangement of the rollers 120, 121 and the belt 122 is such that the line passing through the centers of the rollers is inclined in a direction opposing the direction of approach of the film leader end portion from the roll and at a predetermined angle with respect to the perpendicular passing through the point of contact between the belt 122 on the roller 121 and the roll of film 12. Such an inclined arrangement enables the outer surface 170 of the belt 122 to engage and deliver the leader end portion to the threading portion 124. Thus, the movable belt 122 also acts as guide means for the leader end portion. Further, a film passage defining member 130 having a threading surface 123 cooperable with the film passage surface 17 of the stripper means 15 to thread the stripped film end portion is formed integrally with the base plate 125 so as to provide film passage means. The driven and driving rollers 121 and 120 are best shown in an enlarged sectional view of FIG. 8. The means having the above-described three functions is hereinafter referred to as "film threading means".

Such film threading means, generally designated by numeral 119, is secured to a movable plate 139 which is movable with respect to the body of the device by a coil spring 138 secured thereto, so as to make the threading means 119 slidable toward the film roll. Studded pins 136 and 137 on the device body are slidably received in two guide slots 140 and 141 formed in the movable plate 139, to thereby cause sliding movement of the plate 139. Thus, the threading means 119 and the passage defining member 130 may be moved together with the aid of the coil spring 138 until the belt 122 on the rollers 120 and 121 is engaged with the film roll 12 or 12'.

The film threading means 119 is driven into its operative position as shown by the solid outlines in FIG. 6 or as shown by the imaginary outlines in FIG. 7, so that the film leader end portion is fed from the roll to a conventional take-off claw (not shown) in the film passage, whereafter the threading means 119 is released from its operative position. Means for accomplishing this may be provided by arranging the various connector means as described in the previous embodiment on the movable plate 139 or by any other similar mechanical arrangement.

Thus, the device according to the present embodiment is operable in the same way as described with respect to the previous embodiment, and its operation need not be described further except the following points. Since the two rollers 120, 121 are arranged in a manner different from those in the previous embodiment and the endless belt 122 is rightwardly downwardly inclined with its outer surface providing no film threading passage surface, the outer surface portion 170 of the belt 122 acts as guide surface for bringing the film leader end portion to the threading portion 124 and to the stripping portion even if the leader end portion should take such a position as indicated at 4' in FIG. 9 during the film feeding process. Thus, the leader end portion can be effectively brought to the film threading portion 124 without deviating in any other way. For this reason, the belt member in this embodiment may be called "guide mechanism" in contrast with the previous embodiment. The leader end portion passed through the threading portion 124 is stripped of the roll by the stripper end 16, whereafter it is threaded between the film passage surface 17 of the stripper and the film threading surface 123 provided by the passage defining means 130 of the threading means 119. In this way, the leader end portion 18 is led from the cartridge to a film take-off claw (not shown).

According to the first embodiment of the present invention, the outer surface of a stripper disposed for resilient contact with a film roll rotatably supported with respect to the device body and the surface portion of the film threading means also disposed for resilient contact with the film roll and opposed to the said outer surface of the stripper cooperate together to define a film threading passage, and the threading means comprises a threading member including two rollers, an endless belt wrapped around these rollers, and a guide member resiliently attached to the threading member and mounted for vibration on an eccentric shaft. This construction readily enables the film leader end portion to be directed to the station where the film threading is to be effected by the endless belt.

According to the second embodiment of the present invention, the device comprises a film threading member having two rollers with an endless belt disposed thereon so that a portion of the belt provides a guide mechanism for the film leader end portion, and a film passage defining member having a surface opposed to the film passage surface of the stripper which is to be engaged by the threading member and form a film threading surface. Thus, the device according to the second embodiment fully ensures smooth feeding of the film leader end portion and is highly effective for its intended purpose.

The above-described forms of film threading mechanism may be applicable not only to motion picture projectors but also to other machines which use a tape or any other strip material than film. It will be apparent to those skilled in the art that the stripping and feeding device for strip material according to the present invention is not limited to the specific forms shown and described herein.

We claim:

1. A device for stripping a leader end portion off a roll of strip material having such end portion and for feeding the strip material, said device comprising:
   stripping means having an end portion for stripping the leader end portion off the roll of strip material;
   threading means including two rollers and an endless belt wrapped around said rollers, said threading means being adapted to feed said leader end portion from said roll of strip material;
   guide means adapted to guide said leader end portion of said strip material to a position where it is fed by said threading means;
   said guide means including a guide member normally biased for rotation in a direction for preventing said leader end portion of the strip material from being unwound outwardly from said roll; and
   operating means including an operating member for releasably urging said stripping means into resilient contact with said roll of strip material, and an operating member for releasably urging said threading means into contact with said roll of strip material.

2. A device as defined in claim 1, wherein said guide member is secured to a roller shaft rotating said roll of strip material, said guide member being eccentric with respect to the axis of said roller shaft, whereby said guide member can be vibrated with rotation of said roller shaft.

3. A device as defined in claim 1, wherein said threading means also acts as passage means for guiding said leader end portion of the strip material after being stripped off said roll.

4. A device for stripping a leader end portion off a roll of strip material having such end portion and for feeding the strip material, said device comprising:
   stripping means having an end portion adapted for resilient contact with said rolled strip material to strip the leader end portion off said roll of strip material, and a strip passage surface adapted to direct the stripped leader end portion from said rolled strip material in a threading manner;
   threading means adapted to make pressure contact with said roll of strip material to rotate the same so that said leader end portion of said rolled strip material is directed toward said stripping means, said threading means having two rollers, an endless belt wrapped around said rollers and a threading passage surface disposed in opposite and cooperable relationship with respect to said strip passage surface of said stripping means so that the stripped leader end portion is threaded away from said roll of strip material when the roll is rotated by said rollers and said endless belt;
   said two rollers being arranged so that the line passing through the centers of said two rollers is inclined in the unwinding direction of said leader end portion with respect to a line passing through the centers of said roll and the roller which is disposed at a position nearest to the roll when threading;
   means for releasably urging said stripping means into resilient contact with said roll of strip material, and means for carrying said threading means, slidable with respect to said device including a slider adapted to urge said threading means into contact with said roll of film.

5. A device according to claim 4, wherein said threading means further has a plate member rotatably supporting said two rollers, said plate member including a supporting portion for said two rollers and a portion forming said threading passage surface to guide said leader end portion stripped by said threading means in the threading direction.

6. A motion picture projector for unwinding and projecting a roll of film having a leader end portion, said projector comprising:
   means for rotatably supporting a roll of film;
   stripping means including an end portion adapted to bear against the rolled film so as to strip said leader end portion of said film off the roll, and a film passage surface adapted to direct said stripped leader end portion from said roll in a threading manner;

threading means adapted to make resilient contact with said roll of film to rotate the same in its unwinding direction so that said leader end portion of the rolled film is directed toward said stripping means, said threading means having two rollers, an endless belt wrapped around said rollers, and a film threading surface provided in opposite and cooperable relationship with respect to said film passage surface of said stripping means so as to thread said stripped film leader end portion from said roll when said roll of film is rotated by said rollers and said endless belt;
   guide means adapted to guide said leader end portion of said strip material to a position where it is fed by said threading means, said guide means including a guide member normally biased for rotation in a direction for preventing said leader end portion from being unwound outwardly from said roll.

7. In a motion picture projector for unwinding and projecting a rotatable roll of film having a leader end portion, the improvement comprising;
   a stripper adapted to resiliently contact the roll of film in a film unwinding direction during the rotation of said film roll and to strip the film leader end portion off said roll, said stripper defining a film passage surface for threading the stripped film leader end portion from said roll;

a movable endless belt member adapted to make a pressure contact with said roll of film in the film unwinding direction in the vicinity of said stripper and to drive said roll of film for rotation, said belt member defining a film threading surface opposed to and spaced apart from said film passage surface of said stripper so as to provide a film passage for directing therethrough said film leader end portion from said roll; and guide means for guiding the leader end portion of said film toward said stripper, including a movable guide member normally biased for rotation in a direction for preventing said leader end portion from being unwound outwardly from said roll.

8. In a motion picture projector provided with means for rotatably supporting a cartridge containing therein a roll of film having a leader end portion and an opening for permitting access to said roll of film from outside the cartridge, the improvement comprising:

stripping means including an end portion which is movable into said cartridge through said opening and adapted to bear against said roll of film so as to strip the leader end portion of said film off the roll;

threading means adapted to move between a first position for making a pressure contact with said roll of film in a film unwinding direction so as to thread the film from said roll and rotate said roll in a film unwinding direction and a second position for inhibiting the pressure contact with and rotation of said roll of film, said threading means including a roller movable into said cartridge to make contact with said roll of film when said threading means is positioned in the first position;

a pivotally movable guide member adapted to guide said leader end portion of said film toward a position where it is fed by said threading means and normally biased for rotation in a direction for preventing said leader end portion from being unwound outwardly from said roll;

and operating means for moving said threading means from its second position to its first position.

9. In a combination of a cartridge of varying size containing therein a rotatable roll of film having a leader end portion and having an opening for permitting access to said roll of film from outside the cartridge, and a motion picture projector capable of unwinding the rolled film in said cartridge irrespective of the size of the cartridge, said projector comprising:

rotatable means for carrying said cartridge thereon and rotatably mounting thereon the roll of film in said cartridge;

stripping means including an end portion adapted to advance into said cartridge through said cartridge opening to bear against the roll of film and thereby strip the leader portion off said roll of film;

threading means movable with respect to the body of said motion picture projector, a part of said threading means being adapted to advance into said cartridge through said cartridge opening to make pressure contact with the roll of film while permitting the rotation of the latter in a film unwinding direction thereby threading the film leader end portion;

a pivotally movable guide member adapted to guide said leader end portion of said film toward a position where it is fed by said threading means and normally biased for rotation in a direction for preventing said leader end portion from being unwound outwardly from said roll; and operating means supported by the body of said motion picture projector and slidable toward the loaded position of said cartridge, said operating means including a slider member for retractably advancing said threading means through said cartridge opening into contact with said roll of film, and a start member to actuate said slider member to move the latter up to the contact position with said roll of film in the cartridge irrespective of the size of said cartridge.

10. In a motion picture projector adapted to have a supply roll of film, having a leader end portion, rotatably supported thereon, the improvement comprising:

drive means for rotating said roll in an unwinding direction;

stripping means for resiliently contacting said roll of film and stripping the leader end portion of the film off the roll, said stripping means including a film passage surface to direct the stripped leader end portion from said roll of film in a threading manner;

and guide means adapted to guide said leader end portion of the roll of film to a position where it is fed by said drive means, said guide means including a guide member normally biased for rotation in a direction for preventing said leader end portion of the roll of film from being unwound outwardly from said roll.

11. In a strip material handling machine adapted to have a supply roll of strip material, having a leader end portion of said strip material, rotatably supported thereon, the improvement comprising:

a stripper to strip the leader end portion off the roll of strip material;

threading means for rotating said roll of strip material in an unwinding direction, said threading means having a movable member to make contact with said roll and to feed said leader end portion from said roll of strip material;

and guide means adapted to guide said leader end portion of said strip material to a position where it is fed by said threading means, said guide means including a guide member normally biased for rotation in a direction for preventing said leader end portion of the strip material from being unwound outwardly from said roll.

12. In a strip material handling machine adapted to have a supply roll of strip material, having a leader end portion of said strip material, rotatably supported thereon, the improvement comprising:

a stripper to strip the leader end portion off the roll of strip material;

drive means for rotating said roll in an unwinding direction;

feeding means adapted to make contact with said roll and to feed said leader end portion from said roll toward said stripper; and guide means adapted to guide said leader end portion of said strip material to a position where it is fed by said feeding means, said guide means including a guide member normally biased for rotation in a direction for preventing said leader end portion of the strip material from being unwound outwardly from said roll.

13. In combination with a motion picture projector, a device for feeding film from a rotatably supported roll of film, having a leader end portion, to a stripping mechanism comprising:
 a drive roller;
 a driven roller spaced from said roller;
 an endless belt wrapped around said rollers;
 carrying means for rotatably supporting said rollers and substantially covering said belt wherein said carrying means is adapted to expose a segment of said belt to enable said belt to contact said roll and rotate the same in an unwinding direction to feed the leader end portion of said roll toward said stripping mechanism; and
 guide means adapted to guide said leader end portion of said film to a position where it is fed by said exposed segment of said belt, said guide means including a guide member normally biased for rotation in a direction for preventing said leader end portion of the film from being unwound outwardly from said roll.

14. In combination with a motion picture projector, a device for stripping and feeding film from a rotatably supported roll of film having a leader end portion, comprising:
 stripping means movable from an inoperative position to an operative position wherein said stripping means resiliently contacts said roll and is adapted to strip said leader end portion of said film off the roll and provides a film passage surface for the stripped leader end portion of said film;
 threading means movable between an inoperative position and an operative position, said threading means when in said operative position being in contact with said roll and being adapted to rotate said roll in a film unwinding direction and to feed the leader end portion toward said stripping means;

guide means movable from an inoperative position to an operative position wherein said guide means in said operative position is adapted to guide said leader end portion of said film to a position where it is fed by said threading means,
 said guide means including a guide member normally biased for rotation in a direction for preventing said leader end portion of the film from being unwound outwardly from said roll; and
 operating means adapted to simultaneously move said threading means and said guide means from their respective inoperative positions to their operative positions.

* * * * *